March 13, 1973 H. R. HOFMANN 3,720,793

SUPERVISORY CIRCUIT ARRANGEMENT FOR TELEPHONE SUBSCRIBER LINES

Filed Sept. 1, 1971

United States Patent Office 3,720,793
Patented Mar. 13, 1973

3,720,793

SUPERVISORY CIRCUIT ARRANGEMENT FOR TELEPHONE SUBSCRIBER LINES

Henry Robert Hofmann, Naperville, Ill., assignor to Bell Telephone Laboratories, Incorporated, Murray Hill, N.J.

Filed Sept. 1, 1971, Ser. No. 176,828
Int. Cl. H04m 3/04
U.S. Cl. 179—18 HB 12 Claims

ABSTRACT OF THE DISCLOSURE

A telephone subscriber supervisory circuit in which a line off-hook condition can be detected during one of periodic reductions in power in the applied ringing current during the typical two-second ringing interval. The ringing current consists of a modified sine-wave having its positive alternations clipped at the leading edge to the zero axis of the wave for a predetermined interval. During this interval the line relay is actuated to connect supervisory direct current to the line for testing for the off-hook condition. The short interruptions in ringing current are inaudible to subscribers.

BACKGROUND OF THE INVENTION

This invention relates to supervisory circuits for electronic telephone switching systems and, more particularly, to such circuits adapted to signal subscriber subsets and to detect subscriber responses.

In one typical electronic telephone switching system described in The Bell System Technical Journal (BSTJ), vol. 48, October 1969, ringing current for signaling a called subscriber is applied to individual subscriber lines via a service circuit through the switching network. An alternating current supplied by a generator included in the service circuit actuates the called subscriber's ringer with a relatively large, low-frequency voltage, here, typically 20 Hz. at approximately 86 volts RMS. Ringing interruptions are periodically spaced in the ringing period by the operation of a timing relay which disconnects the ringing source from the called subscriber line to provide successive two-second ringing and four-second silent intervals. Such intervals may also be produced by other ringing machine arrangements as is well known in the art. Scanning of the called subscriber line to detect an answer is performed during both the ringing and silent intervals of the ringing period and may be accomplished by a ferrod sensing element as described in the foregoing BSTJ. The sensing of a subscriber answer may also be accomplished, as is known, by a line relay arrangement connected across the subscriber line. An off-hook answer condition is detected in this manner by the response of the relay to direct, but not to alternating, current during the four-second break in ringing current. Energization of the latter relay completes, via its contacts, scanning circuit connections for advising the central control of the telephone system of the called subscriber response. This fact is manifested in the aforementioned ferrod arrangement by the magnetic state of the ferrod element which is saturated by current in an off-hook subscriber loop. As a result, when interrogated, the ferrod element fails to generate an on-hook read-out signal, which absence in this case notifies central control of the called subscriber response. Connection of the ringing service circuit is then removed and a connection between calling and called subscriber is established through the switching network.

In the past, telephone switching systems, including electronic systems such as that referred to in the foregoing, have generally employed space division networks through which transmission paths are established by means of metallic crosspoints. To date these crosspoints have proved satisfactory in view of their reliability and low contact resistance and one such device, for example, employed in the aforementioned electronic system, termed the ferreed, has been particularly advantageous in serving as a buffer for its relatively slow-moving contacts and the microsecond range pulses which control its operation. Metallic crosspoints have also been readily capable of transmitting the relatively high voltage, low frequency ringing signals through the switching network to the subscriber lines. In recent years, however, the demand for faster response time for network crosspoints as well as the requirement for circuit integration has turned the attention in the art from metallic contact relays to semiconductor switching devices as possible crosspoint elements. These elements such as PNPN transistors, for example, have shown considerable promise and offer significant advantages over metallic crosspoints from the standpoints of size, speed of operation, and cost. Other properties have, however, limited their application and in the present state of the semiconductor art, specific problems must be overcome before solid state crosspoints find general acceptance in large-scale telephone switching system networks. A prominent one of these problems is the inability of the semiconductors to transmit the peak voltages of the low-frequency ringing signals mentioned hereinbefore. Since these ringing signals cannot be passed through the network, other arrangements have been provided for supplying the ringing current in order to render a semiconductor switching network practicable. One solution simply bypasses the network by providing an individual ringing and ring-trip circuit for each subscriber line located between a subscriber subset and the network. This, however, is a costly measure and adds substantially to system complexity and circuit requirements. Additionally, means must be provided for each subscriber line for detecting an off-hook service request condition.

In accordance with the present invention, relay contact means are provided which operate to connect a subscriber line with a source of ringing current. Conveniently, the same relay means may be employed to connect the same subscriber line to the scanning apparatus and switching network to observe subscriber requests for service and ringing response and to provide a talking path. To open the relay contacts during the application of ringing current, however, would cause intolerable contact arcing. This could, of course, be minimized by timing the relay to operate only at the zero axis crossing of the sine-wave ringing current. A critical timing problem is thus merely substituted for the problem of arcing.

This invention is thus directed to the achievement of a number of objects one of which is to provide a new and improved ringing circuit for a telephone subscriber line permitting the sharing of a ringing current source by a number of subscriber subsets and the simultaneous ringing of these subsets.

It is also an object of this invention to utilize the off-hook, service request detection apparatus of a telephone system to detect an off-hook answer condition of the line during both the silent and the active intervals of an active ringing period.

Another object of this invention is to improve telephone subscriber service by reducing the response time of the system to subscriber answers to ringing signals.

A further object of this invention is to obviate the need in a telephone system to transmit subscriber ringing current through the system switching network.

Still another object of this invention is to provide a new and novel supervisory circuit arrangement for a telephone subscriber line.

SUMMARY OF THE INVENTION

The foregoing and other objects of this invention are realized in one specific embodiment thereof in which an alternating ringing current in a telephone subscriber ringing circuit is modified from its sinusoidal waveform to one in which it is periodically reduced in magnitude, preferably at the zero crossing of the sine-wave axis. During an interval in each cycle of the ringing current, as a result, ringing power is reduced to zero, the ringing current source thus being in effect disconnected from the subscriber line although still physically connected thereto. During this interval—in one embodiment, about 10 milliseconds—the same circuitry for detecting a subscriber off-hook or service request line condition is connected across the called subscriber line to test for the latter's response to the ringing signals.

According to one feature of this invention a single ringing current source may serve a number of subscriber lines within an office and these may be simultaneously signaled under the direction of the system central control and subscriber responses detected during active ringing periods without interference among the lines or audible interruptions in the ringing signals. It has been found in practice that the ringing current may be interrupted for at least 15 milliseconds, initiated at about the point at which the ringing voltage sine-waveform crosses through its zero axis, with no interruption in the subset ringer operation being audible to a subscriber.

A subscriber response as evidenced by a detected off-hook line condition conventionally serves to disconnect the answering line from the ringing current source also under the direction of system central control. It is another feature of this invention that a subscriber supervisory circuit embodying its principles may be employed in connection with existing line scanning apparatus of a telephone system without modification of the latter, at the same time advantageously eliminating the requirement for the conventional ring-trip relay.

BRIEF DESCRIPTION OF THE DRAWING

The foregoing and other objects and features of this invention will be better understood from a consideration of the detailed description of one illustrative embodiment thereof which follows when taken in conjunction with the accompanying drawing in which.

DETAILED DESCRIPTION

Figure 1:
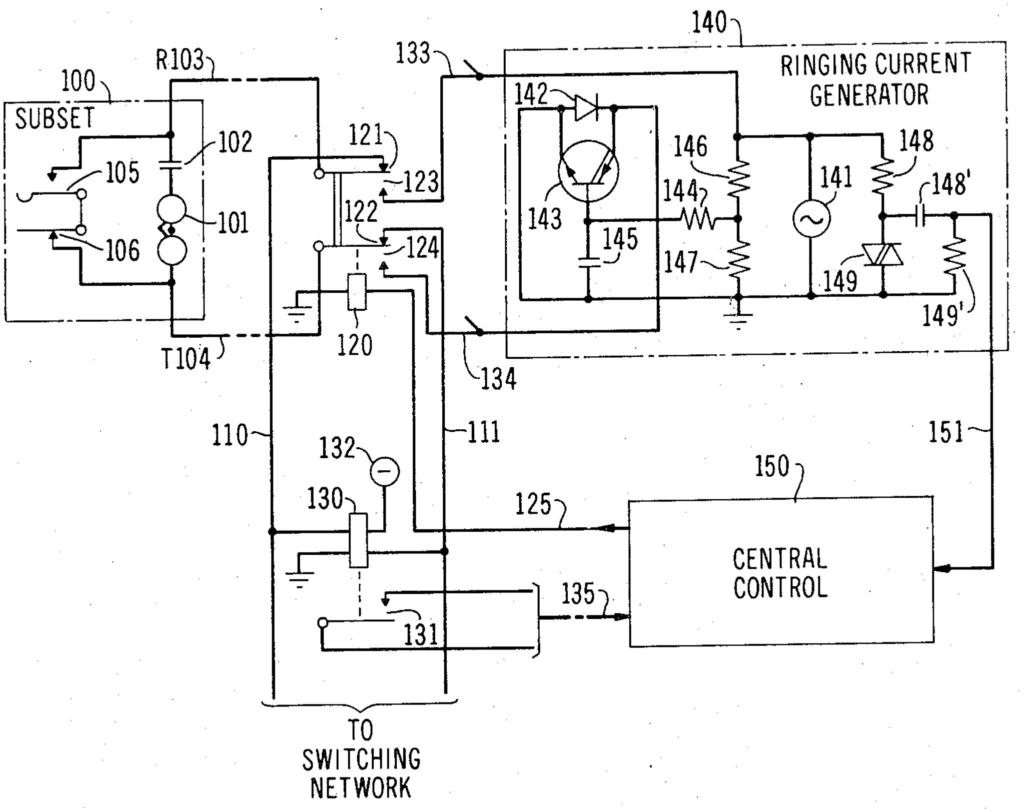
FIG. 1 depicts in schematic and block diagram form an illustrative ringing and supervisory circuit arrangement for telephone subscriber lines according to the principles of this invention.

An illustartive telephone subscriber line ringing circuit and circuit means for detecting a subscriber response in accordance with this invention is shown in FIG. 1 as serving a conventional telephone subset 100. The elements of the latter with which this invention is chiefly concerned comprise a ringer 101 serially connected with a D.C. blocking capacitor 102 across ring and tip conductors R103 and T104 and a hookswitch 105 (shown in on-hook position) serially connected with typical dial contacts 106 also connected across the ring and tip conductors. The latter conductors are understood to be extended from the telephone station including the subset 100 to the central office where the remainder of the elements shown in FIG. 1 are physically located. At that point a talking and control path comprising a pair of conductors 110 and 111 extend the ring and tip conductors to the switching network of the system with which the circuits of the invention may advantageously be adapted for use. Since the network does not constitute an essential element of this invention it is not shown nor is further described.

However, in accordance with one aspect of this invention, a network comprising semiconductor crosspoints fully exploits the advantages and features offered by this invention. The conductors 110 and 111 are connected to the ring and tip conductors R103 and T104, respectively, via break contacts 121 and 122 of a transfer relay 120, the energization circuit of which will be considered hereinafter. Connected across the conductors 110 and 111 is a supervisory relay 130 controlling a pair of make contacts 131; the relay 130 has a first winding serially connected between conductor 110 and a source of negative potential 132 and a co-winding serially connected between conductor 111 and ground. The contacts 131 are operative to control any scanning circuit arrangement presently being employed in electronic switching systems for generating signals for transmission to the central control indicative of subscriber line service events. Since details of the actual scanning arrangement are not necessary to an understanding of this invention they need not be considered here other than its ultimate input control as shown in the drawing.

A second pair of contacts 123 and 124 controlled by relay 120 are operable to transfer the subscriber line comprising the conductors R103 and T104 from the talking path of conductors 110 and 111 to a pair of conductors 133 and 134 extended to a ringing current generator 140. The organization and details of the latter circuit will best be understood from a description of a typical operation of the ringing and supervisory circuit of this invention with particular reference to the timing chart of FIG. 2. In a normal idle line condition the transfer relay 120 is in the inoperative state and its contacts are in positions as shown in the drawing; that is, completing supervisory paths for the subscriber line loop via contacts 121 and 122 to the supervisory relay 130, which relay is thus prepared for energization in response to any request for service as manifested by the closure of the hookswitch 105 at subset 100. The transfer relay 120 is controlled by a circuit completed via a conductor 125 from ground extended to the central control 150 of the system with which the present invention is adapted for use. Upon instructions from the latter central control that the subscriber line including subset 100 is to be signaled, relay 120 is operated by current applied via conductor 125 to close relay contacts 123 and 124 and open its contacts 121 and 122. As a result, ring and tip conductors R103 and T104 are transferred from the talking conductors 110 and 111 to ringing conductors 133 and 134, respectively. In accordance with this invention, the current waveform supplied by central control 150 to transfer relay 120 is of a particular character to be considered hereinafter.

The subset 100 is now connected to ringing current generator 140 which generates a constant alternating current of a character and in a manner which may now be considered in detail. The generator 140 comprises current source 141 for providing a basic sine-wave alternating current, typically having a frequency of 20 Hz., together with circuitry for modifying this current according to this invention to achieve a waveform of the character depicted in FIG. 2 at *a*. Since one terminal of the source 141 is grounded, a diode 142 connected between that terminal and conductor 134 will pass the negative-going half-cycles of the generated current. During the positive-going half-cycles, the source 141 also applies a voltage across the conductors 133 and 134; however, at the initiation of these half-cycles at the zero crossings of the sine-wave axis, the only path to ground for the current is through an as yet unactivated PNPN transistor 143. The point in time at which transistor 143 is turned on is determined by a phase shifting network comprising a resistor 144 and capacitor 145. The latter elements are connected between the base of transistor 143 and ground, and between that base and a tap of a voltage divider, respectively. The voltage divider is connected across the terminals of source 141 and comprises a pair of resistors 146 and 147 which operate to reduce the voltage applied to the phase shifting network.

Figure 2:
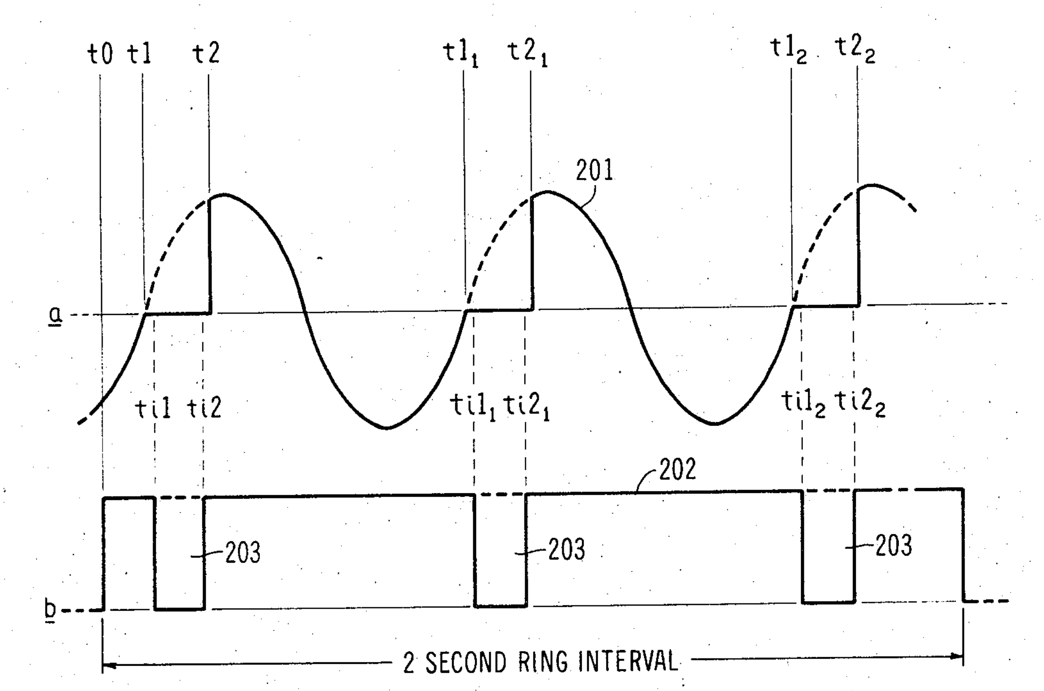
FIG. 2 is a timing chart indicating the sequence of operation of particular elements of the circuit arrangement of FIG. 1 in relationship to the novel ringing current waveform employed in accordance with this invention.

The values of resistors 144, 146, and 147, and capacitor 145 thus govern the delay introduced in the positive-going portion of the positive half-cycles of the source 141 output. In one specific ringing circuit constructed according to this invention, the values of these elements were chosen to achieve a delay in the activation of transistor 143 of 10 milliseconds. When transistor 143 is rendered conductive after the predetermined delay by the voltage applied from the phase shifting network, a circuit to ground is completed for the positive cycles of the generated current which may be traced from the upper terminal of source 141 as viewed in the drawing, conductor 133, now closed contacts 123, conductor R103, capacitor 102, ringer 101, conductor T104, now closed contacts 124, conductor 134, and the electrodes of transistor 143. An alternating ringing current comprising a sine-wave modified as ideally depicted by the waveform 201 in FIG. 2 is thus generated. At each cycle, indicated at representative alternate zero crossing of the sine-wave axis as $t1$, $t1_1$, and $t1_2$, the positive-going half-cycles are each reduced to zero magnitude at the leading edges for a time interval $t1$–$t2$. These interruptions in ringing power of the duration substantially as illustrated in the foregoing and the resulting interruption in ringer operation have in practice proved too short to be audible to a listening telephone subscriber. It will be appreciated that in a particular practice of this invention, intervals shorter or longer than the 10 millisecond interval here assumed may be indicated with the interruption in ringer operation remaining within the inaudible range.

Conventionally, the active ringing period of the circuit of FIG. 1 is made up of an alternating series of two-second ringing and four-second silent intervals. The latter intervals are introduced in the application of ringing current by the operation of transfer relay 120 under the control of instruction signals applied thereto from central control 150. One of such signals is shown at *b* in FIG. 2 as a positive direct current 202 initiated at time $t0$ and extending for the two-second ringing duration. The initiation and termination of the signal 202 is controlled by timing circuits included in the central control 150 of a character well-known in the art. These circuits are thus readily envisioned by one skilled in the art and need not be considered in detail here beyond specifying the nature and timing of the signals required. The current 202 is applied from its source in central control 150 via conductor 125 to the winding of relay 120. As that relay operates, its contacts 121 and 122 are opened and contacts 123 and 124 are closed thereby disconnecting the subscriber line conductors R103 and T104 from the talking path to the ringing circuit conductors 133 and 134. As a result, the ringing current in the form shown in FIG. 2 and described in the foregoing is applied to the ringer of subset 100 via the ring and tip line conductors to alert the called subscriber. As mentioned hereinbefore, the cyclic interruptions of ringing current 201 will go unnoticed by the called subscriber or by any other subscribers of the office with which the ringing current source 140 is shared. In accordance with one aspect of this invention, these interruptions provide zero voltage intervals in the ringing power during which the called subscriber line is tested for an answer condition. Opening of the relay 120 contacts 121 and 122 may under the zero voltage condition be accomplished without arcing. Furthermore, the timing of the operation of relay 120 is noncritical since intervals $t1$–$t2$ provide ample operating margins. To provide for such testing operations, the relay 120 control current received from central control 150 has corresponding interruptions 203 periodically introduced therein by its generating and timing source. As depicted in FIG. 2, the interruptions are timed to occur concurrently with the intervals $t1$–$t2$ although not necessarily for the entire duration of the latter intervals. Only three representative interruptions are shown in the drawing, the first occurring at time $ti1$, somewhat later than the zero crossing at time $t1$ of the alternating current 201, and terminating at $ti2$, somewhat before the leading edge of current 201. The remaining interruptions 203 are also timed to occur relative to the zero crossings of the alternating current 201. Maintaining the boundaries of the interruptions 203 within the time limits of the intervals $t1$–$t2$, ensures that the ringing current 201 will be applied for its full, uninterrupted duration.

Coordination of the frequency of alternating current 201 and the timing of the interruptions 203 is conveniently obtained by taking a timing signal from the ringing current generator 140. At an output stage of the latter generator, a resistor 148 and varistor 149 serially connected across the terminals of source 141, serve to clip the ringing voltage and thereby reduce the output appearing at a tap between these elements. This output is applied across a capacitor 148′ and a load resistor 149′ and transmitted as a timing signal via a conductor 151 to central control 150. The timing signal thus obtained then controls the occurrence at the source in central control of the interruptions 203 of relay 120 control current 202.

If, during an interruption 203 of the relay control current 202, the hookswitch at subset 100 remains on-hook, the energizing circuit for the supervisory relay 130 remains open and subsequently current 202 returns to its normal ringing current value thereby reclosing contacts 123 and 124 and restoring the subscriber subset 100 and current generator 140 connection. However, should the called subscriber have answered and the subset 100 gone off-hook, the energizing circuit for the supervisory relay 130 will be completed at the hookswitch 105. The energizing circuit for the relay 130 may be traced to ground from the negative potential source 132 via the relay winding, conductor 110, contacts 121, conductor R103, hookswitch 105 (now closed), dial contacts 106, conductor T104, contacts 122, conductor 111, and the second winding of relay 130. When the latter relay operates as a result, its contacts 131 will be closed thereby completing a signaling circuit to central control 150 via a cable 135. Such a circuit may comprise any suitable scanning arrangement known in the art for advising central control of the subscriber answer. Upon receipt of this answer, central control 150 instructs the restoration of transfer relay 120, thereby returning the subscriber line conductors R103 and T104 to their normal connection with the talking path conductors 110 and 111. The latter transfer is not delayed until the end of a two-second ringing interval, but may occur at any time during the intervals $t1$–$t2$ of ringing current 201 and corresponding interruptions 203 of relay 120 current 202.

Manifestly, a subscriber answer condition may also be detected during a four-second silent interval of the ringing period. The silent intervals are also controlled from central control 150 via conductor 125 to restore the subscriber loop and talking path connections at the same time that the ringing current generator 140 is disconnected.

It will be apparent that other modes of operating the supervisory circuit of this invention are possible. For example, since during the intervals $t1$–$t2$ represented in FIG. 2, the output of current generator 140 is reduced to zero, as mentioned earlier, the generator is effectively disconnected from the subscriber line even if the contacts 123 and 124 remain closed. No current from the ringing generator 140 flows in the subscriber line during this interval to interfere with the detection of an off-hook condition. Accordingly, in another specific embodiment of this invention the ringing current generator 140 may be maintained connected to the subscriber line during the entire two-second ringing interval of the active ringing period. The functions of transfer relay 120 are separated in this case, two relays being required to operate respectively the break contacts 121 and 122 and the make contacts 123 and 124. The current for operating the make contact relay for connecting the generator 140 to the subscriber line would require only the waveform 202 without the interruptions 203 depicted in FIG. 2. The current for operating the break contact relay for disconnecting the talking path conductors 110 and 111 would take the waveform of the current 202 substantially as shown in FIG. 2. It will also be appreciated that the subscriber line need not be observed during each cycle of the ringing current 201. Thus, the interruptions 203 may be timed to occur during any particular cycles of the current 201 as required by the system with which this invention is adapted for use.

What have been described are considered to be only illustrative embodiments of this invention. Various and numerous other arrangements may be devised by one skilled in the art without departing from the spiirt and scope of this invention as defined by the accompanying claims.

What is claimed is:

1. A telephone subscriber line supervisory arrangement comprising a subscriber line loop, a ringing circuit including a current generator means for generating and applying to said loop an alternating current having a modified sine-wave form characterized by the alternations of one polarity being clipped at the leading edge to the zero axis of said sine-wave for a predetermined time interval, and a supervisory circuit for detecting the condition of said line loop comprising relay means for applying a direct current to said loop during said time interval.

2. A telephone subscriber line supervisory arrangement comprising a subscriber line loop, a ringing circuit including a current generator for generating an alternating ringing current characterized by a wavefom having particular alternations of one polarity at the leading edges reduced to zero axis of said alternating current for a predetermined time interval, a supervisory circuit for detecting the condition of said line loop, first control means for connecting said ringing circuit to said subscriber line loop, and second control means for connecting said supervisory circuit to said subscriber line loop during said predetermined time interval.

3. A telephone subscriber line supervisory arrangement as claimed in claim 2 in which said first control means includes means for disconnecting said ringing circuit from said subscriber line loop during said predetermined time interval.

4. A telephone subscriber line supervisory arrangement as claimed in claim 3 also comprising means for timing the operation of said first and second control means responsive to said ringing current.

5. A telephone supervisory system comprising a plurality of subscriber line loops, a ringing circuit common to said line loops, said ringing circuit including a current generator for generating an alternating current characterized by particular alternations of one polarity being reduced in amplitude for a predetermined time interval less than the individual periods of said alternations, first control means for connecting said ringing circuit to selected ones of said plurality of subscriber line loops, a supervisory circuit means for each of said selected ones of said line loops for detecting idle and busy conditions, and a second control means for connecting each of said supervisory circuit means to said selected ones of said line loops during said predetermined time interval.

6. A telephone supervisory system as claimed in claim 5 in which said first control means includes means for disconnecting said ringing circuit from said selected ones of said plurality of subscriber line loops during said predetermined time interval.

7. A telephone supervisory system as claimed in claim 6 also comprising means for timing the operation of said first and second control means simultaneously responsive to said alternating current.

8. In a telephone system, in combination, a subscriber line loop, a ringing circuit comprising means for generating an alternating current and circuit means for modifying said current by reducing the amplitude of particular alternations for a predetermined time interval, a supervisory circuit for detecting the hookswitch condition of said subscriber line loop, first switch means controllable to connect said ringing circuit to said subscriber line loop for an active ringing period, and second switch means controllable to connect said supervisory circuit to said subscriber line loop during said predetermined time interval.

9. In a telephone system, the combination according to claim 8 in which said first switch means is also controllable to disconnect said ringing circuit from said subscriber line loop during said predetermined time interval.

10. In a telephone system, the combination according to claim 9 also comprising means for simultaneously controlling said first and second switch means responsive to and in accordance with the alternations of said alternating current.

11. In a telephone system having a switching network, in combination, a plurality of subscriber line loops, a plurality of talking paths for connecting said line loops to said switching network, a ringing circuit common to said plurality of line loops, said ringing circuit comprising means for generating an alternating current and circuit means for modifying said current by reducing particular alternations to substantially zero amplitude for a predetermined time interval, a plurality of supervisory circuits associated respectively with said talking paths for detecting the condition of said line loops, first switch means for connecting said ringing circuit to selected ones of said plurality of subscriber line loops for an active ringing period, and second switch means for connecting respective ones of said talking paths to said selected ones of said plurality of line loops during said predetermined time interval.

12. In a telephone system having a switching network, the combination as claimed in claim 11 also including means for controlling said first switch means to disconnect said ringing circuit from said subscriber line loops during said predetermined time interval.

References Cited

UNITED STATES PATENTS

| | | | |
|---|---|---|---|
| 3,651,271 | 3/1972 | Knauer | 179—18 HB |
| 3,601,547 | 8/1971 | Potter | 179—18 GF |

THOMAS W. BROWN, Primary Examiner

U.S. Cl. X.R.

179—84 R